US007908146B2

(12) United States Patent
Kaneko et al.

(10) Patent No.: US 7,908,146 B2
(45) Date of Patent: Mar. 15, 2011

(54) DIGITAL TELEVISION RECEIVER CONTROLLED BY SPEECH RECOGNITION

(75) Inventors: Mayumi Kaneko, Daito (JP); Naoki Yamamoto, Daito (JP); Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 944 days.

(21) Appl. No.: 11/806,240

(22) Filed: May 30, 2007

(65) Prior Publication Data

US 2007/0282612 A1 Dec. 6, 2007

(30) Foreign Application Priority Data

May 31, 2006 (JP) ................... 2006-151719

(51) Int. Cl.
*G10L 21/06* (2006.01)
(52) U.S. Cl. ...................................................... 704/275
(58) Field of Classification Search .................... 704/275
See application file for complete search history.

(56) References Cited

U.S. PATENT DOCUMENTS

| 6,654,721 B2 * | 11/2003 | Handelman .................. 704/270 |
| 2002/0052746 A1 | 5/2002 | Handelman |
| 2003/0065427 A1 | 4/2003 | Funk et al. |
| 2003/0078781 A1 | 4/2003 | Julia et al. |
| 2004/0172256 A1 | 9/2004 | Yokoi et al. |

FOREIGN PATENT DOCUMENTS

| EP | 0 651 372 A2 | 5/1995 |
| JP | 4-32900 A | 2/1992 |
| JP | 6-332665 A | 2/1994 |
| JP | 6-149534 A | 5/1994 |
| JP | 2000-287242 A | 10/2000 |
| JP | 2004-61576 A | 2/2004 |
| JP | 2006-58641 A | 3/2006 |

OTHER PUBLICATIONS

Huang et al., "Spoken Language Processing—A Guide to Theory, Algorithm, and System Development," 2001, pp. 921-942, Prentice Hall, Upper Saddle River, New Jersey, XP002444019.
"Speech-Driven System for Identifying Materials," IBM Technical Disclosure Bulletin, Dec. 1995, pp. 113-115, vol. 38, No. 12, IBM Corp., New York, NY, XP000588088.
European Search Report dated Aug. 27, 2007 (ten (10) pages).
Japanese Office Action dated Dec. 21, 2010 with English translation (four (4) pages).

* cited by examiner

*Primary Examiner* — Susan McFadden
(74) *Attorney, Agent, or Firm* — Crowell & Moring LLP (57) ABSTRACT

A digital television received is provided. The receiver includes an information storage to store menu screen identification information about a menu screen displayed on a display section, the menu screen including an item corresponding to the command information, the identification information associated with the command information corresponding to the item displayed on the menu screen; a judgment section to determine whether or not the obtained command information falls in the command information stored in the command information storage associated with the menu screen identification information; a control section to perform control based on the command information when the judgment section judges that the obtained command information falls in the command information stored in the command information storage associated with the menu screen identification information.

4 Claims, 5 Drawing Sheets

FIG.2

| MENU SCREEN IDENTIFICATION INFORMATION | COMMAND INFORMATION | CONTROL INFORMATION |
|---|---|---|
| 1 | QUIT | . . . |
| | CHANNEL | . . . |
| | DISPLAY | . . . |
| | CLOCK | . . . |
| | DETAIL | . . . |
| 2 | 7 | . . . |
| | 8 | . . . |
| | 9 | . . . |
| | 10 | . . . |
| | 11 | . . . |
| | 12 | . . . |
| ⋮ | ⋮ | ⋮ |

*FIG.5*

DIGITAL TELEVISION RECEIVER CONTROLLED BY SPEECH RECOGNITION

BACKGROUND OF THE INVENTION

1. Field of the Invention

The present invention relates to electronic equipment which can perform various controls owing to speech recognition function.

2. Description of Related Art

In recent years, along with a progress in multi-functioning and high-functioning of electronic equipment such as a television and video cassette recorder, electronic equipment has been requested to be compatible with various functions and simple operation. Recently, electronic equipment employing a speech recognition technique for such operation has been used.

In earlier development, for example, a voice input system has been known as the electronic equipment employing speech recognition technique, in which a cursor is moved to a desired position on a screen and information pointed by the cursor is output according to a voice instruction (see Japanese patent application publication laid-open No. 06-332665).

Furthermore, a radio information receiver has been known, in which a speech recognition means to recognize a voice command input from a microphone is provided so that it executes processing according to the command recognized by this means (see Japanese patent application publication laid-open No. 2000-287242A).

Furthermore, a voice screen-operation apparatus has been known, in which, when a manager makes a speech (pronounces a word) registered with respect to items while he holds a remote terminal and watches a menu screen displayed on a large display device such as a screen, the pronounced word is converted into a word code at a speech recognition section, an item is selected according to this word code, and the selected item is displayed (see Japanese patent application publication laid-open No. 06-149534A).

However, these apparatuses employing a speech recognition function disclosed in the above documents does not have a configuration of command input by voice that only commands corresponding to items displayed on a menu screen are accepted when a menu screen is displayed. Consequently, these apparatus may perform a command processing which is not intended by a user. It is also problematic that it takes long time to recognize input speech information to specify a command when there is a number of commands which can input by voice.

SUMMARY OF THE INVENTION

It is one of objects of the present invention to provide electronic equipment which can performs command processing intended by a user based on speech recognition according to statuses.

According to a first aspect of the present invention, electronic equipment which performs speech recognition of externally input speech information and is controlled by command information obtained as a result of the speech recognition, comprises; an information storage to store menu screen identification information about a menu screen displayed on a display section, the menu screen including an item corresponding to the command information, the identification information associated with the command information corresponding to the item displayed on the menu screen; a judgment section to judge the menu screen identification information of the menu screen displayed on the display section, so as to determine whether or not the obtained command information as a result of the speech recognition of the input speech information falls in the command information stored in the command information storage associated with the menu screen identification information; an instruction section to accept an instruction of an execution or cancel of control based on the command information corresponding to one item of the menu screen displayed on the display section; a calculation section to calculate a speech recognition certainty which is a success rate of the speech recognition of the externally input speech information; a control section which operates when the judgment section judges that the obtained command information as a result of the speech recognition falls in the command information stored in the command information storage associated with the menu screen identification information, wherein: when the speech recognition certainty of the command information calculated by the calculation section is at a predetermined value or more, the control section performs control based on the command information; and when the speech recognition certainty is less than the predetermined value, the control section displays an item corresponding to the command information of the menu screen displayed on the display section in an identifiable manner and performs control based on the command information when execution of the control based on the command information corresponding to the item displayed in the identifiable manner is instructed on the instruction section; and a display control section, when the judgment section judges that the obtained command information as a result of the speech recognition does not fall in the command information stored in the command information storage associated with the menu screen identification information, to display a result of the judgment by the judgment section on the display section.

According to the first aspect, when speech information is input externally, the equipment accepts only command information corresponding to the item displayed on the menu screen. Consequently, command processing intended by a user can be performed appropriately by the speech recognition according to statuses. Further, it is only necessary to match the command information corresponding to the items displayed on the menu screen. Thus, the command by the speech recognition can be specified rapidly. Furthermore, if the speech recognition certainty is at the predetermined value or more, control corresponding to the obtained command information as a result of speech recognition is performed directly. If the speech recognition certainty is at less than the predetermined value or more, the item corresponding to the obtained command information as a result of the speech recognition is once displayed in an identifiable manner, and then, if the item is the one intended by a user, control corresponding to the item can be performed. Thus, it becomes possible to prevent a malfunction, and to perform the control efficiently according to the speech recognition certainty.

Further according to the first aspect, when the command information does not correspond to the item displayed on the menu screen, it can be notified to a user. Thus, it becomes possible to request a user to provide next operation, such as to input the speech information again.

According to a second aspect of the present invention, electronic equipment which performs speech recognition of externally input speech information and is controlled by command information obtained as a result of the speech recognition, comprises; an information storage to store menu screen identification information about a menu screen displayed on a display section, the menu screen including an item corresponding to the command information, the identification information associated with the command information corresponding to the item displayed on the menu screen; a judgment section to judge the menu screen identification information of the menu screen displayed on the display section, so as to determine whether or not the obtained command information as a result of the speech recognition of the input speech information falls in the command information stored in the command information storage associated with the menu screen identification information; a control section to performs control based on the command information when the judgment section judges that the obtained command information as a result of the speech recognition falls in the command information stored in the command information storage associated with the menu screen identification information.

According to the second aspect, when speech information is input externally, the equipment accepts only command information corresponding to the item displayed on the menu screen. Consequently, command processing intended by a user can be performed appropriately by the speech recognition according to statuses. Further, it is only necessary to match the command information corresponding to the items displayed on the menu screen. Thus, the command by the speech recognition can be specified rapidly.

Preferably, the electronic equipment of the second aspect further comprises: an instruction section to accept an instruction of an execution or cancel of control based on the command information corresponding to one item of the menu screen displayed on the display section, wherein, when the judgment section judges that the obtained command information as a result of the speech recognition falls in the command information stored in the command information storage associated with the menu screen identification information, the control section displays an item corresponding to the command information of the menu screen displayed on the display section in an identifiable manner, and when execution of control based on the command information corresponding to the item displayed in the identifiable manner is instructed on the instruction section, the control section performs the control based on the command information.

According to this feature, the item corresponding to the obtained command information by the speech recognition is displayed in an identifiable manner, and if the item is the one intended by a user, control corresponding to the item can be performed. Consequently, it becomes possible to prevent a malfunction of the speech recognition, and to perform the command processing intended by a user appropriately.

Further preferably, the electronic equipment of the second aspect further comprises: a calculation section to calculate a speech recognition certainty which is a success rate of the speech recognition of the externally input speech information, wherein the control section operates when the judgment section judges that the obtained command information as a result of the speech recognition falls in the command information stored in the command information storage associated with the menu screen identification information; when the speech recognition certainty of the command information calculated by the calculation section is at a predetermined value or more, the control section performs the control based on the command information; and when the speech recognition certainty is less than the predetermined value, the control section displays the item corresponding to the command information of the menu screen displayed on the display section in the identifiable manner and performs control based on the command information when execution of the control based on the command information corresponding to the item displayed in the identifiable manner is instructed on the instruction section.

According to this feature, if the speech recognition certainty is at the predetermined value or more, control corresponding to the obtained command information as a result of speech recognition is performed directly. If the speech recognition certainty is at less than the predetermined value or more, the item corresponding to the obtained command information as a result of the speech recognition is once displayed in an identifiable manner, and then, if the item is the one intended by a user, control corresponding to the item can be performed. Consequently, it becomes possible to prevent a malfunction, and to perform the control efficiently according to the speech recognition certainty.

Preferably, the electronic equipment of the second aspect further comprises: a display control section, when the judgment section judges that the obtained command information as a result of the speech recognition does not fall in the command information stored in the command information storage associated with the menu screen identification information, to display a result of the judgment by the judgment section on the display section.

According to this feature, when the command information does not correspond to the item displayed on the menu screen, it can be notified to a user. Thus, it becomes possible to request a user to provide next operation, such as to input the speech information again.

BRIEF DESCRIPTION OF THE DRAWINGS

The present invention will become more fully understood from the detailed description given hereinbelow and the appended drawings which is given by way of illustration only, and thus are not intended as a definition of the limits of the present invention, and wherein.

DETAILED DESCRIPTION OF THE PREFERRED EMBODIMENT

Hereinafter, an embodiment of the present invention is described in detail with reference to the drawings. In this embodiment, a digital television receiver is given as an example of the electronic equipment.

However, the electronic equipment is not limited to this, and may be a home electric appliance such as a video cassette recorder or an air conditioner.

First, a whole structure and main configuration of the equipment are described with reference to FIG. 1.

A digital television receiver 100 of the present embodiment, for example, comprises an equipment body 1 to receive a television broadcast signal (hereinafter referred to as a broadcast signal), to convert the received broadcast signal to a predetermined output signal and to output video/audio data, and a remote control device 2 (hereinafter referred to as an RC) as an instruction section by which a user inputs various directions to remotely control the equipment.

Next, main configuration of the digital television receiver 100 is described.

The equipment body 1 comprises an antenna 3 to receive a broadcast signal, a tuner 4 to select a predetermined broadcast channel from the broadcast signal received by the antenna 3, a demodulator 5 to demodulate the broadcast signal output from the tuner 4 and to perform error correction thereof, a demultiplexer 6 to extract various data from the broadcast signal demodulated by the demodulator 5 so as to obtain video/audio data, a decoder 7 to expand the video/audio data obtained by the demultiplexer 6, an OSD (on-screen display) processing section 8 to add OSD data to the video data expanded by the decoder 7, an image receiver 9 as a display section to output video/audio data processed by the OSD processing section 8, a speech information obtaining section 10 to obtain speech information, an RC signal receiving section 11 to receive an input operation signal from the RC 2 and to output the input operation signal to a controller 12, a controller 12 to control the entire equipment body 1 integrally, and a control bus 13 to connect these sections to each other.

The speech information obtaining section 10 includes, for example, a microphone, and obtains voice directly as the speech information.

The speech information obtaining section 10 may have a configuration of not only obtaining a voice directly as the speech information but also converting a voice to a voice signal and thereafter obtaining the voice signal as the speech information.

The RC signal receiving section 11 receives an input operation signal such as an infrared signal, which is output from the RC 2 by a user pushing down various keys provided thereto, and outputs the input operation signal to the controller 12.

Figure 1:
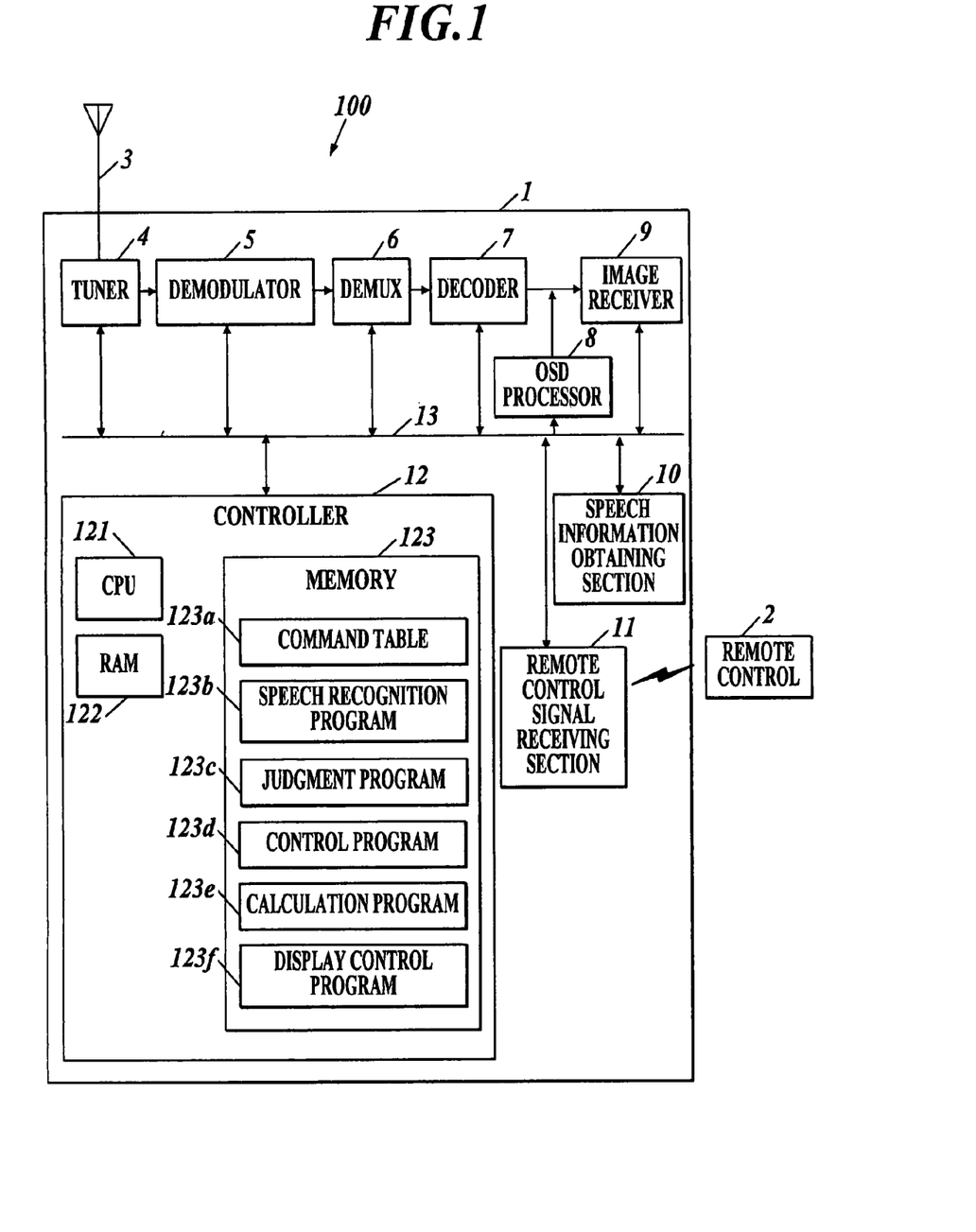
FIG. 1 is a block diagram showing a main configuration of a digital television receiver according to the present embodiment.

The controller 12 comprises, for example as shown in FIG. 1, a CPU (central processing unit) 12, a RAM (random access memory) 122, storage 123, and the like.

The CPU 121 performs various control operations according to a command table and various processing programs stored in the memory 123.

The RAM 122 comprises a program storing area to which a processing program executed by the CPU 121 is expanded, and a data storing area to store input data, a processing result generated in executing the processing program and the like.

The storage 123 stores a system program executable on the equipment body 1, various processing programs executable in the system program, data to be used in executing the various processing programs, data of a processing result calculated by the CPU 121, and the like. These programs are stored in the storage 123 in a form of computer readable program code.

Specifically, the storage 123 stores, for example as shown in FIG. 1, a command table 123a, a speech recognition program 123b, a determination program 123c, a control program 123d, a calculation program 123e, a display control program 123f and the like.

A command table 123a is a table where control information to control the equipment body 1 is associated with command information, and the command information is associated with the menu screen identification information about a menu screen which displays items corresponding to the command information on image receiver 9.

Figure 2:
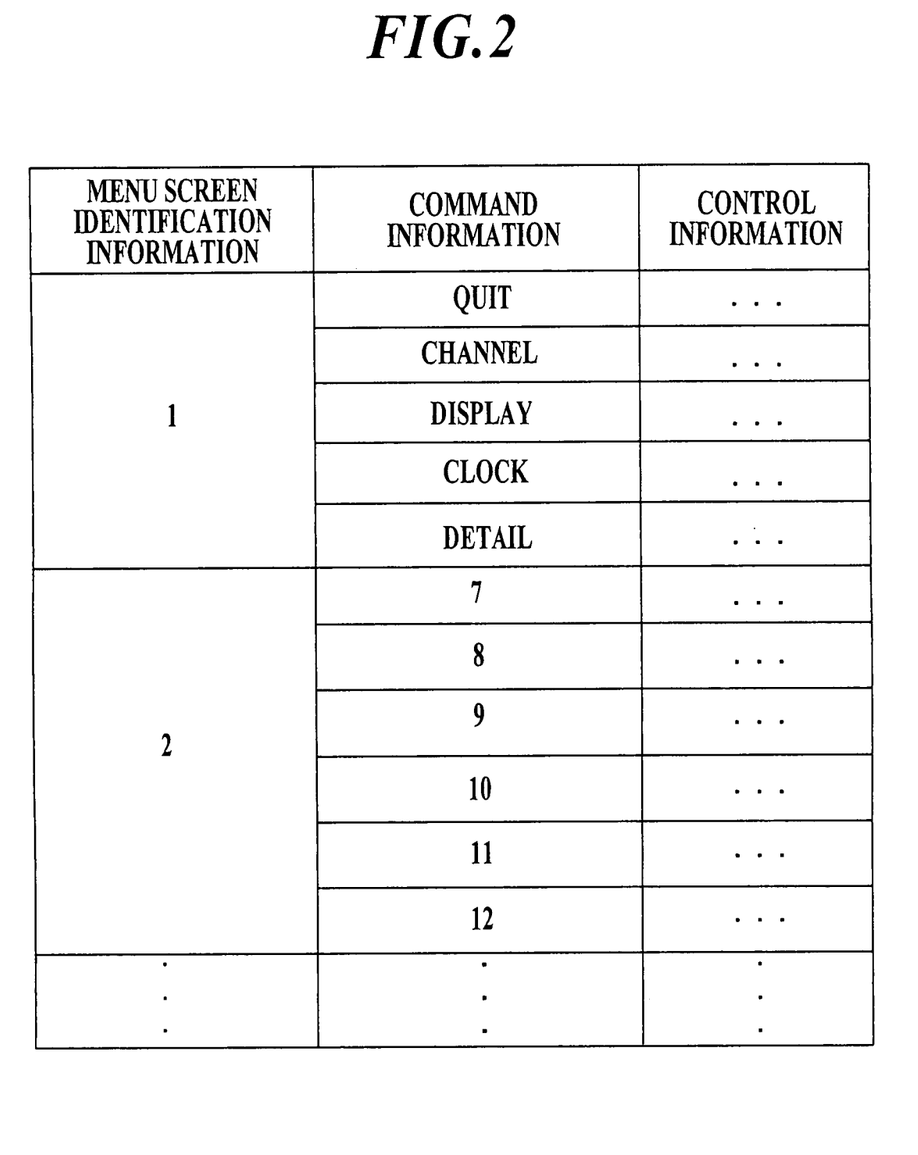
FIG. 2 is one example of a command table according to the present embodiment.
Figure 3:
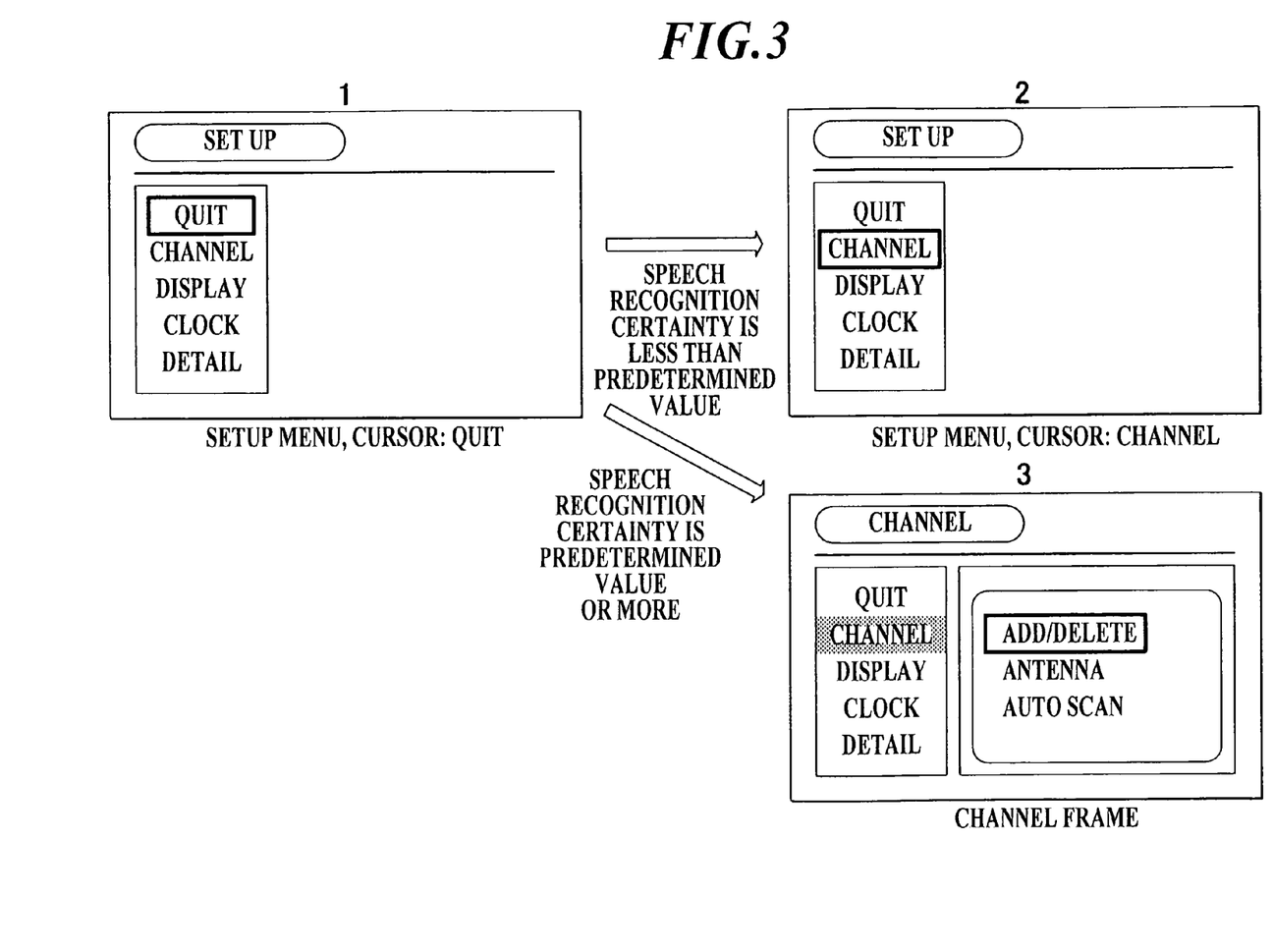
FIG. 3 is an example of menu screens of the present embodiment, where screen 1 is a displayed illustration of a set-up menu, screen 2 is a displayed illustration where an item "CHANNEL" in the set-up menu is displayed in an identifiable manner, and screen 3 is a displayed illustration where a control (displaying a sub menu) based on command information corresponding to the item "CHANNEL" has been executed.
Figure 4:
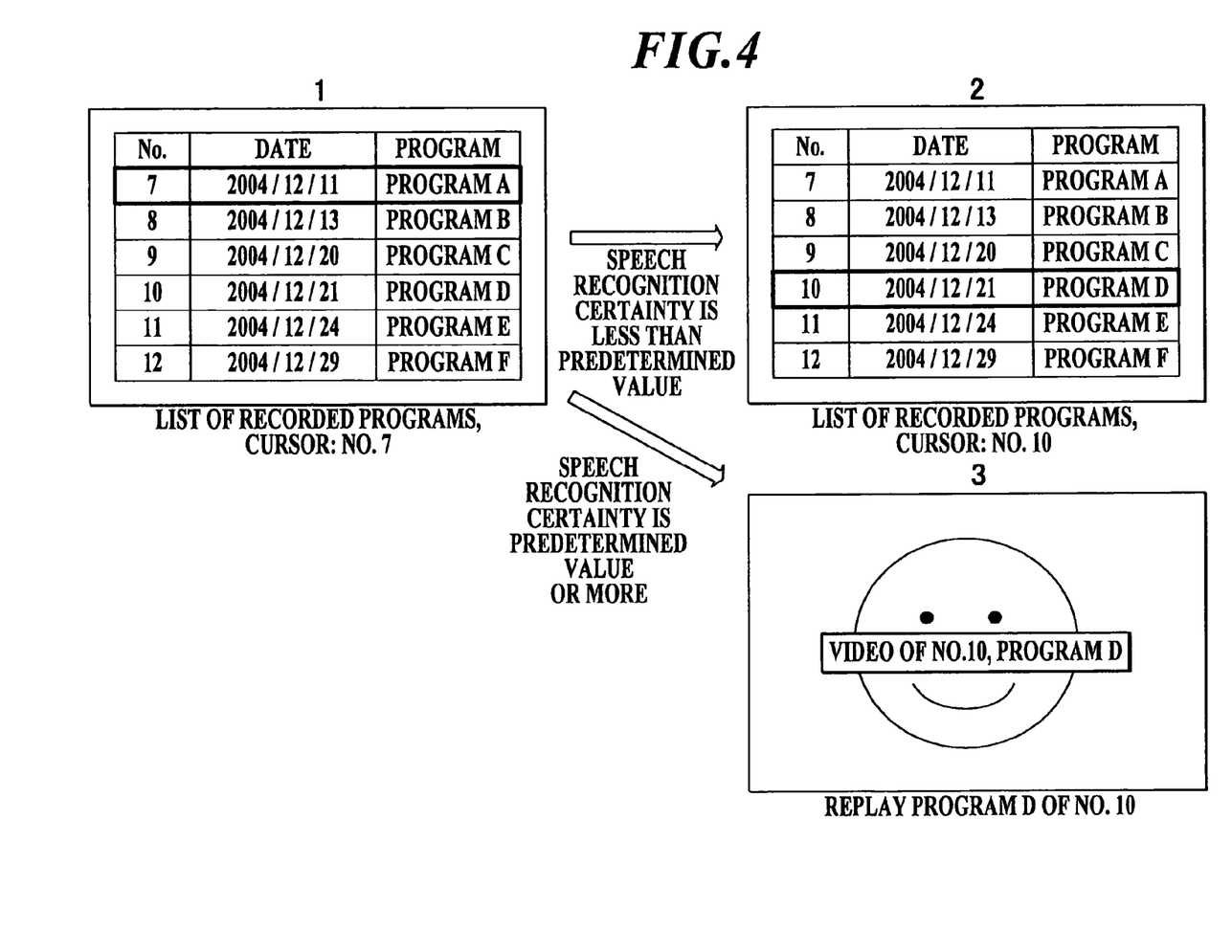
FIG. 4 is an example of menu screens of the present embodiment, where screen 1 is a displayed illustration of a recorded program list, screen 2 is a displayed illustration where an item "10" in the recorded program list is displayed in an identifiable manner, and screen 3 is displayed illustration where a control (replay) based on a command information corresponding to the item "10" has been performed.

Specifically, for example as shown in FIG. 2, menu screen identification information 1 (setup menu screen, see FIG. 3A) is associated with command information items "QUIT", "CHANNEL", "DISPLAY", "CLOCK" and "DETAIL", and menu screen identification information 2 (recorded program list, see FIG. 4A) is associated with command information items "7", "8", "9", "10", "11" and "12".

The storage 123 stores the command table 123a to function as a command information storage.

The speech recognition program 123b is a program to cause the CPU 121 realize a function of performing speech recognition processing on the speech information obtained by the speech information obtaining section 10.

The speech recognition is performed by a speech recognition software such as JULIUS, and is performed with a enormous quantity of collected statistical data regarding speech patterns and language patterns. A basic principal of the speech recognition is that frequency patterns of an acoustic model (phoneme (nearly corresponding to each character of Roman alphabets) and syllables (corresponding to each Japanese syllabary character) are stored, and they are match with syllable row signals obtained by extracting single syllable parts from a speech waveform signal of a input speech with reference to a word dictionary, so as to perform the speech recognition.

Specifically, by executing the speech recognition program 123b, the CPU 121 performs the speech recognition of the speech information obtained by the speech information obtaining section 10, and extracts command information corresponding to the speech recognition result from the command table 123a.

The judgment program 123c is a program to cause the CPU 121 to realize a function of judging menu screen identification information about a menu screen displayed on the image receiver 9 so as to determine whether the obtained command information based on the speech recognition result falls in the command information stored in the command table 123a associated with the said menu screen identification information.

Specifically, as shown in FIG. 3 for example, when a speech "CHANNEL" is input externally as the speech information in a status where a set-up menu screen is displayed on the image receiver 9, the CPU 121 judges the menu screen identification information 1 (see FIG. 2) about the set-up menu screen displayed on the image receiver 9, so as to determine whether the obtained command information "CHANNEL" based on the speech recognition result falls in the command information associated with the said menu screen identification information stored in the command table 123a.

The CPU 121 functions as a judgment section by executing the judgment program 123c.

The control program 123d is a program to cause the CPU 121 to realize a function of performing control based on the command information obtained based on the speech recognition result.

Specifically, in the case where the CPU 121, by executing the judgment program 123c, determines that the obtained command information based on the speech recognition result falls in the command information associated with the menu screen identification information of the menu screen displayed on the image receiver 9, if a speech recognition rate of the determined command information calculated by executing a calculation program 123e described below is at a predetermined value or more, the CPU 121 performs control based on the determined command information. If the speech recognition rate of the determined command information is less than the predetermined value, the CPU 121 displays the item of the determined command information on the menu screen of the image receiver 9 in an identifiable manner. Then, when there is an instruction to execute control based on this command information of the item displayed in the identifiable manner by holding down an execution key (not shown) of the RC 2 functioning as an instruction section, the CPU 121 performs control based on this command information. The television receiver may have a configuration that a user can set or change the threshold value of the speech recognition rate.

The CPU 121 functions as a control section when the control program 123d is executed.

The calculation program 123e is a program to cause the CPU 121 to realize a function of calculating the speech identification rate which shows certainty of the speech recognition. Specifically, by executing the calculation program 123e, for example, the CPU 121 calculates the speech recognition rate which shows certainty of the speech recognition from a score of matching (for example, DP matching and the like) between an amount of characteristics in speech information of a recognition object obtained as a result of speech recognition and a frequency pattern of a previously stored acoustic model.

The CPU 121 functions as a calculating section by executing the calculation program 123e.

The display control program 123f is a program to cause the CPU 121 to realize a function of displaying an absence of corresponding command information in the command table 123a on the image receiver 9.

Specifically, when it is judged by executing the judgment program 123c that the command information obtained as a result of the speech recognition does not fall in the command information stored in the command table 123a associated with the menu screen identification information, the CPU 121 displays on the image receiver 9 by executing the display control program 123f that this command information does not fall in the command information stored in the command table 123a associated with the menu screen identification information.

The CPU 121 functions as a display control section by executing the display control program 123f.

Figure 5:
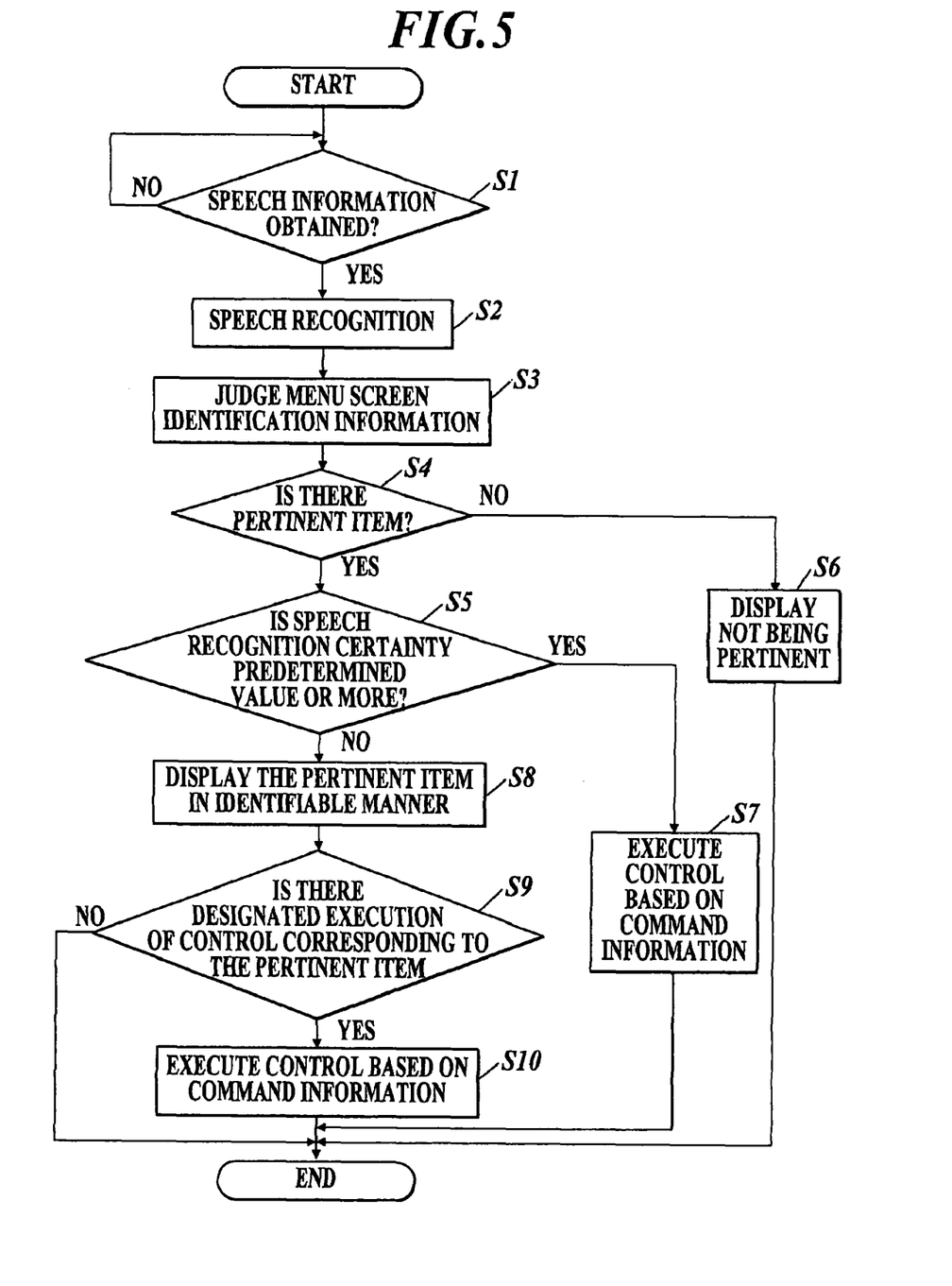
FIG. 5 is a flowchart showing processing at an equipment body according to the present embodiment.

Next, the operation of the equipment body 1 is described with the digital television receiver of the present embodiment as an example using FIG. 5. The operation is described using an example where a setup menu screen shown in FIG. 3 is currently displayed on the image receiver 9.

First, in step S1, the CPU 121 judges whether or not speech information is obtained in the speech information obtaining section 10.

When the CPU 121 judges in step S1 that speech information ("CHANNEL" for example) is obtained in the speech information obtaining section 10 (step S1; Yes), the processing advances to step S2. On the other hand, when the CPU 121 judges in step S1 that speech is not obtained in the speech information obtaining section 10 (step S1; No), the television receiver continues to be in a stand-by state for obtaining speech information.

Next, in step S2, by executing the speech recognition program 123b, the CPU 121 performs speech recognition of the speech information "CHANNEL" obtained in the speech information obtaining section 10, and advances the processing to step S3.

Next, in step S3, the CPU 121 executes the judgment program 123c to judge the menu screen identification information about the screen displayed on the image receiver 9, and advances the processing to step S4.

Next, in step S4, the CPU 121 judges whether or not the command information "CHANNEL" obtained as a result of the speech recognition falls in the command information corresponding to the menu screen identification information of the setup menu screen, which has judged by executing the judgment program 123c.

In step S4, when the CPU 121 judges by executing the judgment program 123c that the command information "CHANNEL" obtained as a result of the speech recognition falls in the command information corresponding to the menu screen identification information of the setup screen (step S4; Yes), the processing advances to step S5.

On the other hand, when the CPU 121 judges by executing the judgment program 123c that the command information obtained as a result of the speech recognition does not fall in the command information corresponding to the menu screen identification information of the setup screen (step S4; No), the processing advances to step S6. Then, by executing the display control program 123f, the CPU 121 displays on the image receiver 9 that the command information obtained as a result of speech recognition result does not fall in the command information corresponding to the menu screen identification information which has determined by executing the judgment program 123c, and the processing ends.

Specifically, in a status as shown in FIG. 4 for example, where a list of recorded programs is displayed on the image receiver 9, the command information "CHANNEL" obtained as a result of speech recognition does not fall in the command information corresponding to the menu screen identification information 2 (see FIG. 2) about this list of recorded programs. Consequently, the CPU 121 displays on the image receiver 9 "No corresponding command" or the like in an OSD manner.

Next, in step S5, by executing the calculation program 123e, the CPU 121 calculates a speech recognition rate of the command information "CHANNEL" obtained as a result of the speech recognition.

In step S5, when the speech recognition certainty calculated by the CPU 121 executing the calculation program 123e is at the predetermined value or more (step S5; Yes), the process advances to step S7. Then, by executing the control program 123d, the CPU 121 performs control corresponding to the obtained command information "CHANNEL" as a result of the speech recognition, and the processing ends. Specifically, as shown in screen 3 of FIG. 3, the CPU 121 performs control of displaying a sub-menu screen of the item "CHANNEL" on the image receiver 9.

On the other hand, in step S5, when the speech recognition certainty calculated by the CPU 121 executing the calculation program 123e is at less than the predetermined value (step S5; No), the process advances to step S8. Then, the CPU 121 displays the item corresponding to the obtained command information as a result of the speech recognition in an identifiable manner.

Next, in step S9, when there is an instruction by holding down an execution key (not shown) of the RC 2 functioning as an instruction section, to execute control based on the command information corresponding to the item displayed in an identifiable manner (step S9; Yes), the process advances to step S10. Then, by executing the control program 123d, the CPU 121 executes control based on the command information, and the processing ends.

On the other hand, in step S9, when there is a designation by holding down a cancel key (not shown) of the RC 2 functioning as a designation section, to cancel control based on the command information corresponding to the item displayed in an identifiable manner (step S9; No), step S10 is skipped and the process ends.

According to the digital television receiver 100 of the present embodiment: the command table 123a store menu screen identification information about a menu screen displayed on a display section, the menu screen including an item corresponding to the command information, the identification information associated with the command information corresponding to the item displayed on the menu screen; the CPU 121, by executing the judgment program 123c, judges the menu screen identification information of the menu screen displayed on the image receiver 9, so as to determine whether or not the obtained command information as a result of the speech recognition of the input speech information falls in the command information stored in the command table 123a associated with the menu screen identification information; it can be instructed to execute or to cancel the control based on the command information corresponding to one item in the menu screen displayed on the image receiver 9 by holding down the execution key or cancel key (not shown) of the RC 2; by executing the calculation program 123e, the CPU 121 calculates a speech recognition certainty which shows a success rate of the speech recognition of the speech information input externally; and in the case where it is judged by executing the judgment program 123c that the obtained command information as a result of the speech recognition falls in the command information stored in the command table 123a associated with the menu screen identification information, the CPU 121 executes the control program 123d to execute control based on the command information when the speech recognition certainty is at a predetermined value or more, and the CPU 121 displays the item corresponding to the command information in the menu screen displayed on the image receiver 9 in an identifiable manner when the speech recognition certainty is less than the predetermined value, and when an execution of the control based on the command information corresponding to the item displayed in the identifiable manner is instructed by holding down an execution key (not shown) of the RC2, the CPU 121 executes the control based on the command information by executing the control program 123d.

Consequently, when the speech information is input externally, only command information corresponding to the item displayed on the menu screen is accepted. Thus, it becomes possible to perform accurately command processing intended by a user by the speech recognition. Moreover, since it is necessary only to check command information corresponding to the item displayed on the menu screen, it becomes possible to specify the command by the speech recognition rapidly.

Furthermore, if the speech recognition certainty is at the predetermined value or more, control corresponding to the obtained command information as a result of speech recognition is performed directly. If the speech recognition certainty is at less than the predetermined value or more, the item corresponding to the obtained command information as a result of the speech recognition is once displayed in an identifiable manner. If the item is the one intended by a user, control corresponding to the item can be performed. Thus, it becomes possible to prevent a malfunction, and to perform the control efficiently according to the speech recognition certainty.

Furthermore, when it is judged by executing the judgment program 123c that the obtained command information as a result of speech recognition does not fall in the command information stored in the command table 123a associated with the menu screen identification information, the CPU 121 display that on the image receiver 9 by executing the display control program 123f.

Consequently, when the command information does not correspond to the item displayed on the menu screen, it can be notified to a user. Thus, it becomes possible to request a user to provide next operation, such as to input the speech information again.

The present invention is not limited to the above embodiment, and may be subject to various modifications and design alternations without departing form the sprit of the present invention.

For example, instruction on the instruction section is not limited to holding down operation of the execution key or cancel key of the RC. The instruction of the execution or cancel of the control based on the command information corresponding to one item in the menu screen displayed on the image receiver may be achieved by speech recognition processing of the speech information. In this configuration, the command information storage stores command information of "EXECUTION", "CANCEL" and the like associated with speech information with respect to each menu screen identification information. The judgment whether to execute control based on the obtained command information as a result of the speech recognition or to display the item corresponding to the obtained command information as a result of the speech recognition in an identifiable manner may be determined based on a user's selection as well as the speech recognition certainty.

Furthermore, for example, when it is judged that the obtained command information as a result of the speech recognition falls in the command information stored in the command table associated with the menu screen identification information of the menu screen displayed on the image receiver, and the item corresponding to the command information on the menu screen is displayed in an identifiable manner, the number of executing control based on the command information corresponding to the item displayed in an identifiable manner or the number of canceling the command information may be counted and the number of execution over the number or displaying the item corresponding to the command information in an identifiable manner may be calculated as a command execution rate and stored in the command table. Then in the next processing or later, when the command information is obtained as a result of the speech recognition, it may be determined whether to execute control based on the obtained command information as a result of the speech recognition or to display the item corresponding to the obtained command information as a result of the speech recognition once in an identifiable manner, based on the command execution rate stored in the command table.

The entire disclosure of Japanese Patent Application No. 2005-025962 filed on Feb. 2, 2005, including description, claims, drawings and summary are incorporated herein by reference in its entirety.

What is claimed is:
1. A digital television receiver comprising:
a speech information obtaining section to obtain speech information;
a speech recognition section to perform speech recognition of the speech information to obtain a command;
a display section to display one or more menu screens;

a display control section to control a display on the display section;

a storage section to store identification information for identifying a presently-displayed menu screen from the one or more menu screens, each of the one or more menu screens displays a plurality of items respectively corresponding to a plurality of pieces of command information, the command information respectively corresponding to the items, and a plurality of pieces of control information respectively corresponding to the command information;

a judgment section to judge a piece of identification information corresponding to the presently-displayed menu screen selected from the stored identification information to determine whether or not the command obtained as a result of the speech recognition corresponds to any of the command information associated with the judged piece of identification information when the speech information is obtained;

a control section to perform a control based on a result of judgment by the judgment section;

a calculation section to calculate a confidence level of the result of the speech recognition; and a remote control device to receive an instruction for determining whether or not a control based on the command information corresponding to one of the items is performed, wherein when the judgment section judges that the command falls in any of the command information, the control section performs the control based on the command information if the confidence level is equal to or more than a predetermined value, and the control section displays an item corresponding to the command information on the display section in an identifiable manner if the confidence level is less than the predetermined value and performs the control based on the command information if the remote control device receives an instruction to perform a control based on the command information corresponding to the item displayed in an identifiable manner, and when the judgment section judges that the command does not fall in any of the command information, the display control section displays a result of the judgment by the judgment section on the display section.

2. A digital television receiver comprising:

a speech information obtaining section to obtain speech information;

a speech recognition section to perform speech recognition of the speech information to obtain a command;

a display section to display one or more menu screens;

a storage section to store identification information for identifying a presently-displayed menu screen from the one or more menu screens, each of the one or more menu screens display a plurality of items respectively corresponding to a plurality of pieces of command information, the command information respectively corresponding to the items, and a plurality of pieces of control information respectively corresponding to the command information;

a judgment section to judge a piece of identification information corresponding to the presently-displayed menu screen from the stored identification information to determine whether or not the command obtained as a result of the speech recognition corresponds to any of the command information associated with the judged piece of identification information when the speech information is obtained;

a control section to perform a control based on a result of judgment by the judgment section; and a remote control device to receive an instruction for determining whether or not a control based on the command information corresponding to one of the items is performed, wherein when the judgment section judges that the command falls in any of the command information, the control section displays an item corresponding to the command information on the display section in an identifiable manner, and performs the control based on the command information if the remote control device receives an instruction to perform a control based on the command information corresponding to the item displayed in an identifiable manner.

3. The digital television receiver according to claim 2, further comprising:

a display control section, when the judgment section judges that the command does not fall in any of the command information, to display a result of the judgment by the judgment section on the display section.

4. The digital television receiver according to claim 2, further comprising:

a calculation section to calculate a confidence level of the result of the speech recognition, wherein when the judgment section judges that the command falls in any of the command information, the control section performs the control based on the command information if the confidence level is equal to or more than a predetermined value, and the control section displays an item corresponding to the command information on the display section in an identifiable manner if the confidence level is less than the predetermined value and performs the control based on the command information if the remote control device receives an instruction to perform a control based on the command information corresponding to the item displayed in an identifiable manner.

* * * * *